G. J. ALBRECHT.
ENVELOP SEALING MACHINE.
APPLICATION FILED APR. 12, 1909. RENEWED NOV. 13, 1914.
1,125,926.
Patented Jan. 26, 1915.
6 SHEETS—SHEET 4.
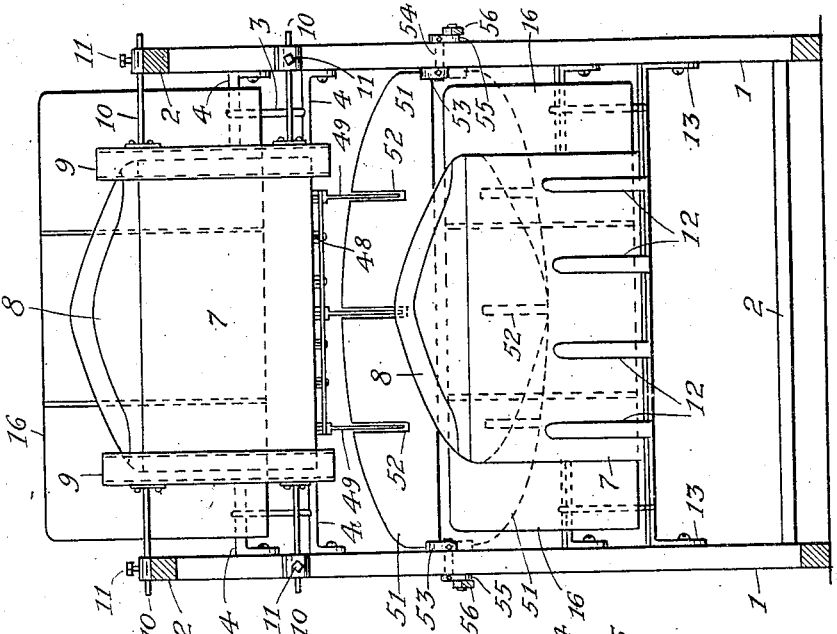
Witnesses:
Thio Lagaard
H. A. Bowman
Inventor:
Guido J. Albrecht
By P. H. Gunckel
his Attorney.

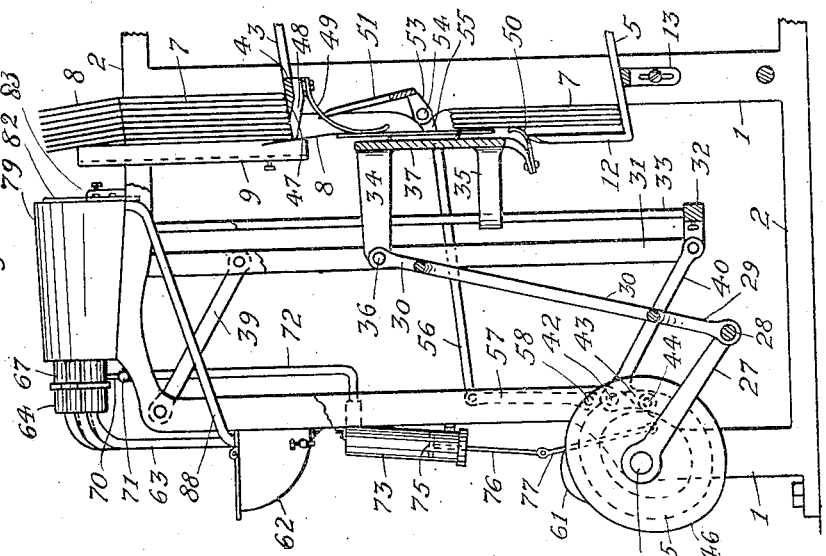

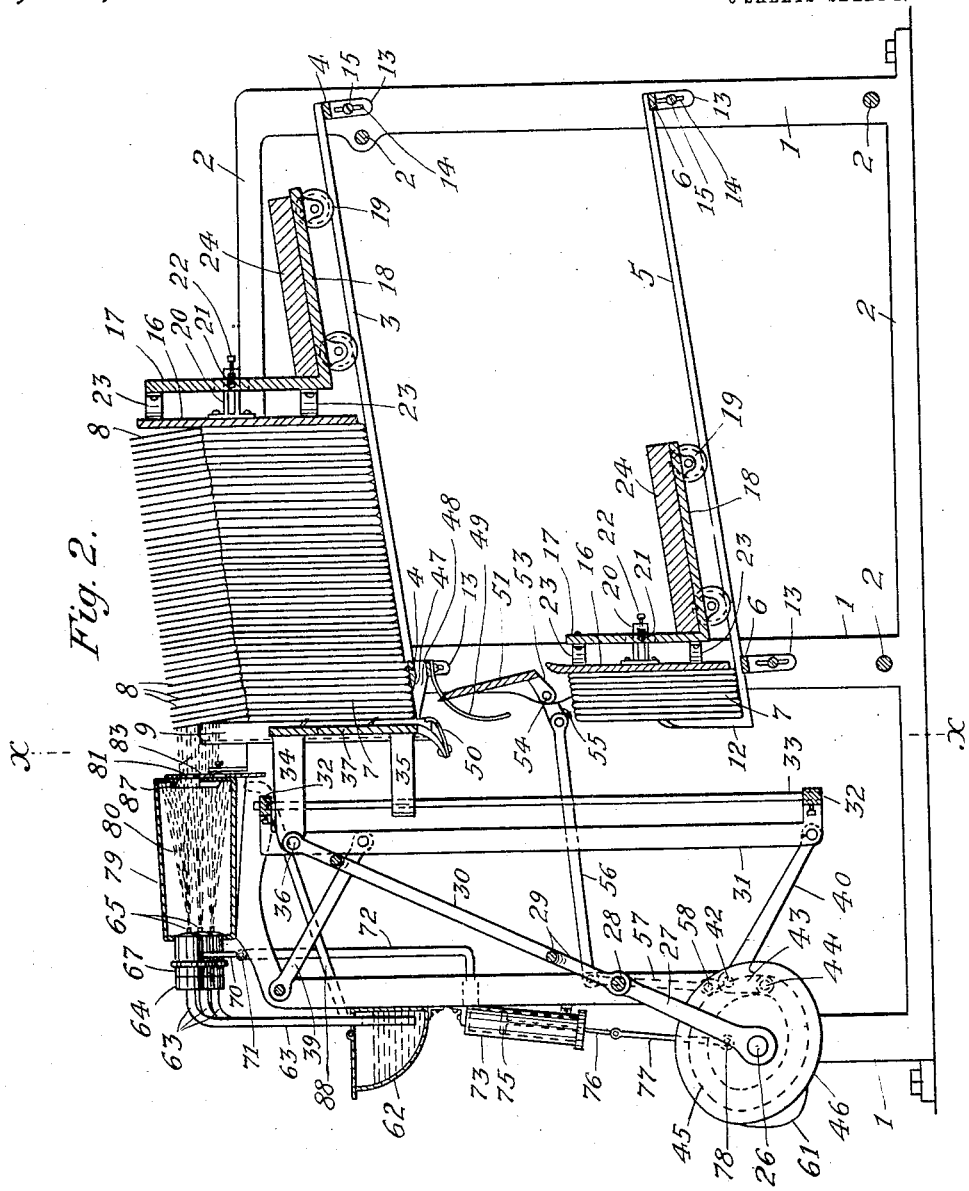

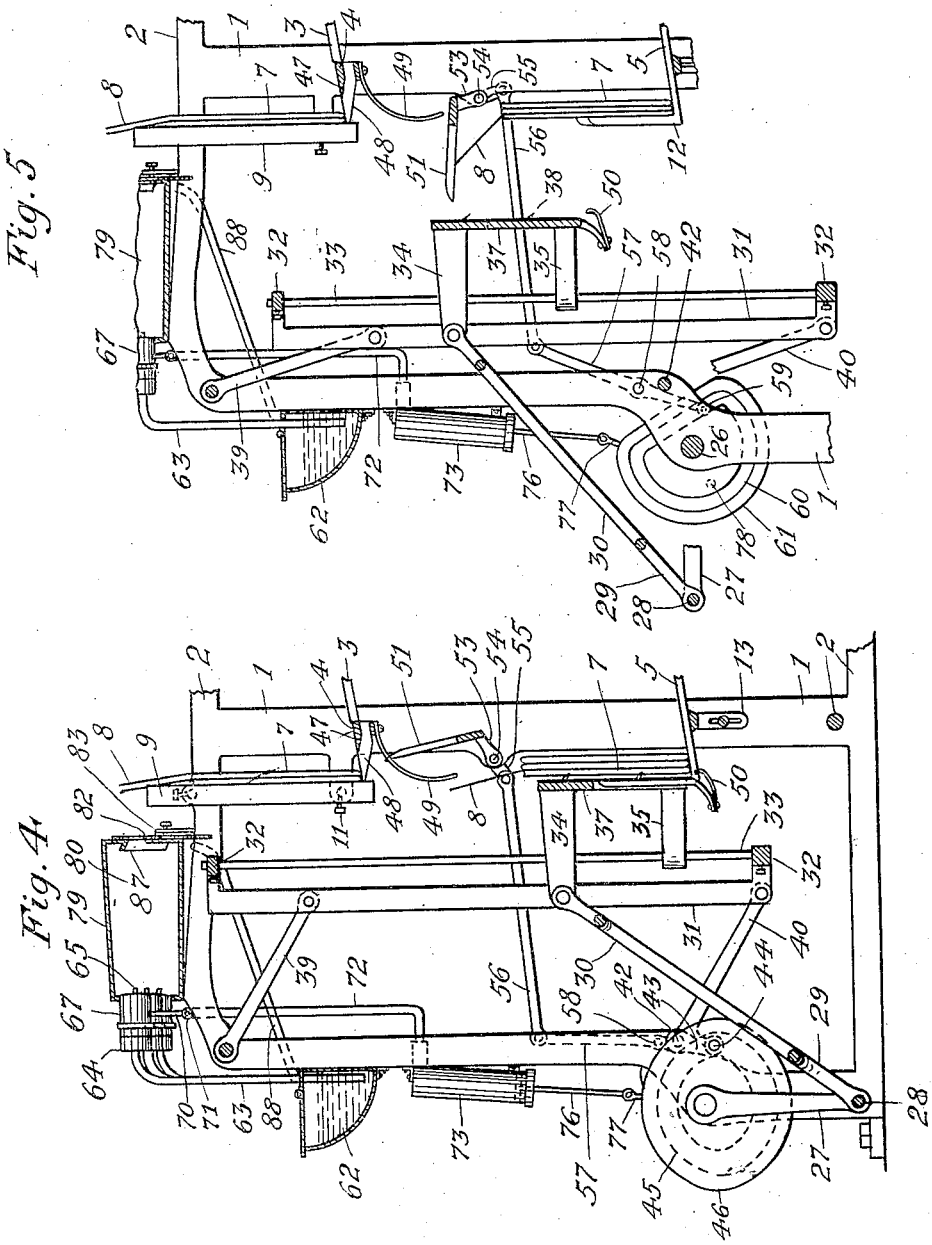

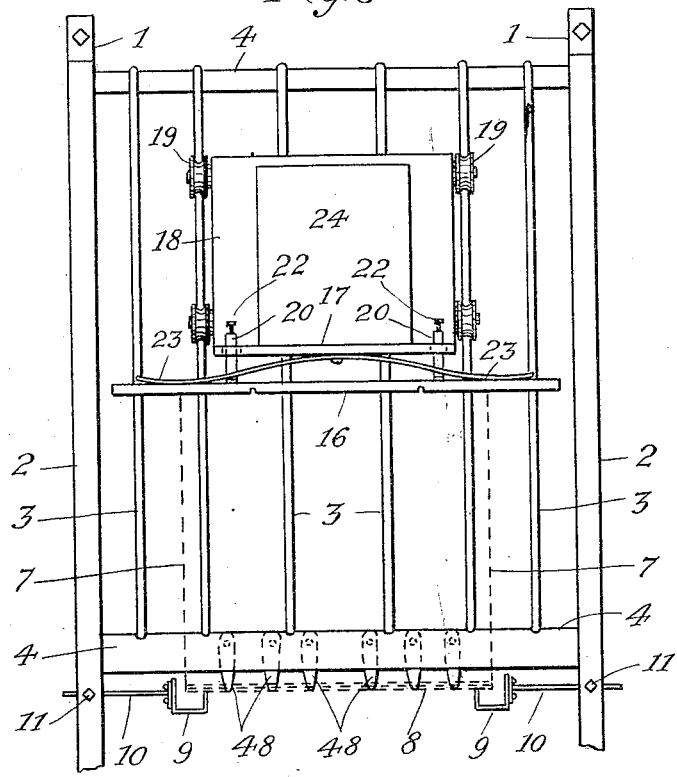

G. J. ALBRECHT.
ENVELOP SEALING MACHINE.
APPLICATION FILED APR. 12, 1909. RENEWED NOV. 13, 1914.
1,125,926.
Patented Jan. 26, 1915.
6 SHEETS—SHEET 6.
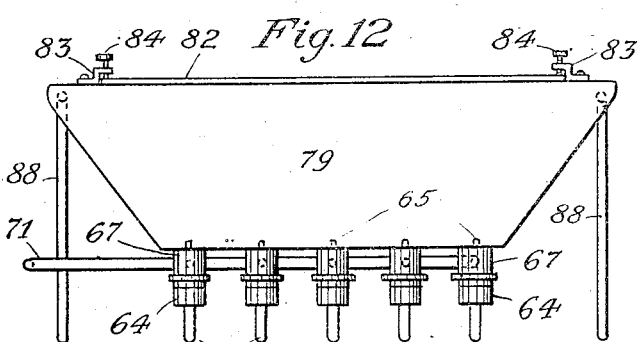
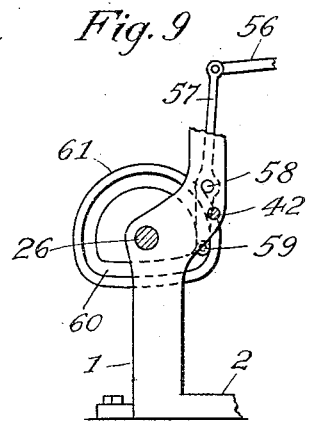
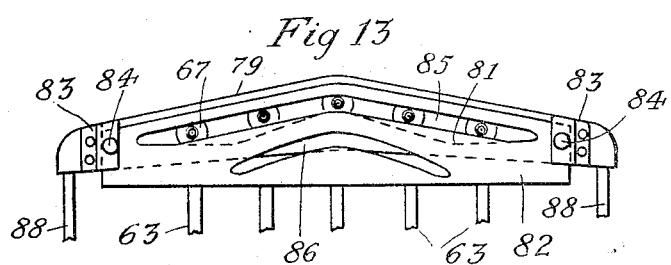
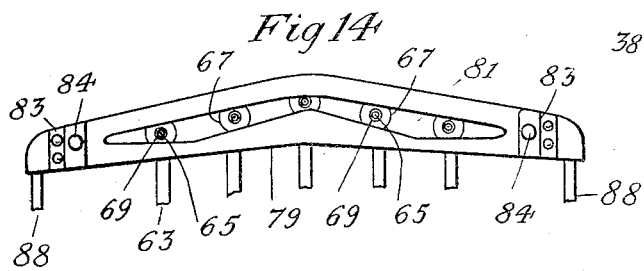
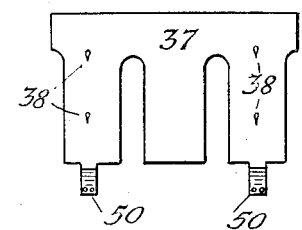
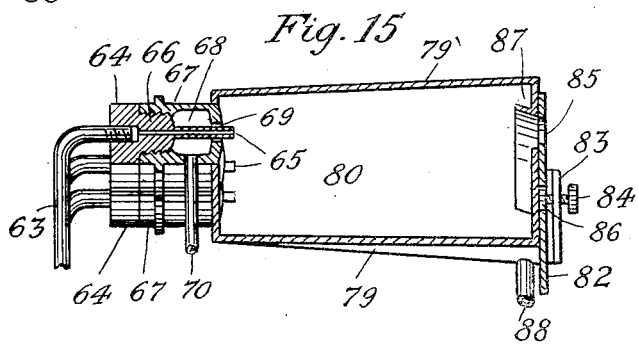
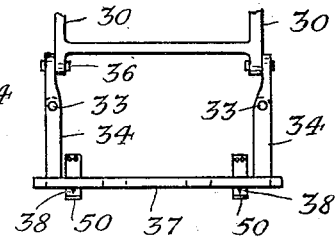
Witnesses:
Theo. Lagaard.
H. A. Bowman.
Inventor:
Guido J. Albrecht.
By P. H. Gunckel
his Attorney.

UNITED STATES PATENT OFFICE.

GUIDO J. ALBRECHT, OF MINNEAPOLIS, MINNESOTA, ASSIGNOR TO LONG MAILING MACHINE COMPANY, OF MINNEAPOLIS, MINNESOTA, A CORPORATION.

ENVELOP-SEALING MACHINE.

1,125,926.   Specification of Letters Patent.   Patented Jan. 26, 1915.

Application filed April 12, 1909, Serial No. 489,270. Renewed November 13, 1914. Serial No. 872,041.

*To all whom it may concern:*

Be it known that I, GUIDO J. ALBRECHT, a citizen of the United States, residing at Minneapolis, in the county of Hennepin and State of Minnesota, have invented certain new and useful Improvements in Envelop-Sealing Machines, of which the following is a specification.

My invention relates to machines or apparatus for moistening and sealing the gummed flaps of envelops.

The main object of the invention is improvement of the means for moistening the gummed portions of the flaps by providing a sprayer; but a further object is improvement of the means employed in machines of this class for presenting the envelops in succession to the moistening device; for moving them thence to an assembling device; and for closing and sealing the moistened flaps.

My improvements are illustrated in the accompanying drawings, in which—

Figure 1 is a front-end elevation of an envelop sealing machine embodying my improvements, and showing the actuating parts in position for moving a moistened envelop downward to be folded and racked. Fig. 2 is a vertical longitudinal section of the machine, approximately on the plane of the broken line *w—w* of Fig. 1. Figs. 3 to 6 are elevations, partly sectional, of approximately the left half of Fig. 2, showing the relative positions of the moving parts at different stages of the operation of conveying an envelop from the upper to the lower rack and folding its flap during the transfer. Fig. 7 is a front elevation and Fig. 8 a plan view of the parts at the right of the broken line *x—x* of Fig. 2. Fig. 9 is a detail view of the cam for actuating the flap folder. Figs. 10 and 11 are detail views of the carrier for transferring the envelops from their upper to their lower positions. And Figs. 12 to 15 are detail views of parts of the spraying device.

In the drawings 1 designates the posts and 2 the horizontal members of the machine frame. In the upper rearward portion of this main frame is secured an open-work frame consisting of longitudinal bars 3 and cross pieces 4 and providing the rack or support for the unsealed envelops; and in the lower portion of the main frame is secured a similar rack, composed of like bars 5 and cross-pieces 6, for supporting the sealed envelops. The unsealed envelops 7, with their flaps 8 open, are arranged in upright position on the upper rack and at the inner end abut a pair of stops 9, preferably of channel shape and having their inner sides shorter than the outer. (See Fig. 8.) These stops are made adjustable toward and away from each other to adapt them for envelops of different lengths, by attaching them to rods 10 that are slidable on the frame work and are held in place by set-screws 11. The lower rack has the inner ends 12 of its bars 5 bent to upright positions, for retaining the sealed envelops. These racks are preferably arranged in inclined positions, and are adjustably attached to the posts 1 by means of plates 13 provided with elongated slots 14 and screws 15, whereby their inclinations can be varied, and their locations on the frame may be adjusted to accommodate for envelops of different widths.

For holding the unsealed envelops in place and feeding them successively to the moistening device, a gravitating follower 16 is provided, and it may be carried, as shown, on the upright portion 17 of a truck 18 which is mounted on grooved wheels 19 that run on a pair of the bars 3. The follower plate or body 16 is connected with the upright member 17 by slotted arms 20 that extend through openings in the member 17 in which are pins 21 that guide the arms; and at the ends of the arms are regulating screws 22 for limiting the movement of the plate 16 away from the part 17. A pair of springs 23 is interposed between the parts 16 and 17 for yieldingly holding the follower to contact with the envelops. The pressure of the follower against the envelops may be increased or decreased as required by means of a suitable weight 24 placed on the truck. The sealed envelops are held in place on the lower rack by a device substantially the same as that just described and therefore needs no specific description.

The driving-shaft 25 of the machine is journaled in the frame at one side, and a driven shaft 26 is journaled in alinement with it in the opposite side of the frame. On the inner ends of the two shafts are secured crank-arms 27 which are connected by a rod or pin 28, and on the rod is pivotally mounted a yoke or frame member 29 from which connecting-rods 30 extend upwardly and are pivoted to a carriage for lowering the envelops in succession from the moistening to the sealing positions. The main frame of the carriage comprises two vertical pieces 31 and cross-bars 32 connecting their ends and supporting upright rods 33. On these rods are upper and lower slidable brackets 34 and 35, to the former of which the connecting-rods 30 are pivoted by a rod or pintles 36. On the brackets 34 and 35 is mounted in vertical position a plate 37 provided with pins or points 38 for engaging the open envelop and carrying it downward from the upper to the lower rack. The upper portions and the lower ends of the carriage parts 31 are connected by radius-bars 39 and 40 to the posts 1, whereby the carriage frame is maintained at all times in vertical position and is caused during portions of its movements to advance toward and recede from the envelop racks.

The extreme upper position of the carriage is illustrated in Figs. 1 and 2. Upon partial rotation of the driving-shaft, about a half turn, by means of an operating crank 41, or otherwise, the carriage and its connections will be in approximately the positions shown in Fig. 4, and the carrier 37 will have lowered an envelop from the upper to the lower rack, and successive positions of the carriage would be as indicated in Figs. 2, 3, and 4. Then, upon further rotation of the driving-shaft the carriage will be moved away from contact with the envelop and toward the front of the machine, and upward, as indicated in Figs. 5 and 6. To aid in effecting this cycle of movements and to retract the carriage a proper distance, the lower radius bars 40 are provided at their fulcrum points 42 with short angular arms 43 which carry pins 44 that engage in cam-grooves 45 formed in wheels 46 which are fast to the driving and driven shafts 25 and 26. The operation of the arms 43 by means of the engagement of their pins 44 in the cam-grooves serves to move the radius bars toward the front of the machine after the carriage has delivered an envelop to the lower rack and during the earlier portion of the upward travel of the carriage, as shown in Figs. 5 and 6.

The front cross-bar 4 of the feed rack 3 is provided with a resilient support or a series of resilient fingers 48, fastened to its under side and extending forward beyond the beveled front portion 47 of the bar for supporting one or more of the envelops. These fingers are preferably composed of rubber and made of somewhat wedge shape to adapt their front ends to be easily bent to allow the envelop that is engaged by the carrier 37 to be removed from the rack. To the same bar are also secured a series of curved downwardly extending springs 49 which serve to yieldingly hold the envelop to contact with the carrier during a portion of its passage from the upper to the lower rack. And to the lower edge of the carrier are attached spring pressers 50 for pushing back the front envelops in the lower rack to make room between them and the abutments 12 for the descending envelop when it is presented by the carrier. (See Fig. 3.)

Intermediate the feeding and storing racks is located the flap-folder 51, consisting of a flat plate provided with slots 52 to permit it to swing past the springs 49. This folder is carried on cranks 53 on the inner ends of short shafts 54 that are journaled on the posts 1. On the outer ends of these shafts are cranks 55, and connecting-rods 56 connect them with the longer upwardly extending arms of levers 57 that are fulcrumed at 58 to the posts 1. The shorter and downwardly extending lever arms are provided with pins 59 which engage in cam-grooves 60 in cam-wheels 61 on the shafts 25 and 26.

The moistening of the gummed portions of the envelops is effected by the following devices: A water reservoir 62 is supported at the upper front portion of the machine, and from it a series of pipes 63 extends to the top of the frame where each pipe communicates with an atomizer or spraying instrument of any suitable construction. In the style of atomizer selected for illustration each pipe 63 has attached to it a head 64 which carries a nozzle 65, the body portion 66 of which is screw-threaded. A small cylinder 67 is screwed onto the nozzle body and provides an interior air-chamber 68 and a narrow passage-way 69 for the air around the sides of the nozzle. Each of the air chambers 68 is in communication with a branch pipe 70 that is connected to an air-supply pipe 71, and the latter is supplied with air under pressure through a pipe 72 that is connected to an air-pump.

The air-pump may be of any suitable construction; as illustrated it consists of a barrel 73 supported by brackets 74 on a post 1, and containing a piston 75 operated by a piston-rod 76 which is pivotally connected to a connecting-rod 77 that is operatively connected to a wrist 78 on the wheel 61. The arrangement and connections of the operating mechanisms are such that the air pump will be operated periodically and at proper intervals to spray the envelop flaps as they are successively exposed by the removal of those in advance by the operation of the carrier.

To avoid undesirable moistening of the envelops and to enable the spray to be directed to the gummed portions only of the flaps, a box-like housing 79 is mounted on the frame in front of the nozzles providing a chamber 80 for receiving their discharge. The housing is preferably tapering or fan-shaped, being relatively narrow at the receiving and wide at the discharging end, and the latter end is provided with a slot 81 approximately of the same curvature as the envelop flaps and of proper length and width to direct the spray to that portion only of the envelop. Means may be provided for varying the size and shape of the discharge opening so that only the gummed portion of the flap will be sprayed. The means illustrated consist of an adjustable slide 82 in guides 83 held in place by set-screws 84, and provided with slots 85 and 86 of suitable shape and proportions to allow the spray to pass and to spread only enough to moisten the gummed portion of the flap. Obviously separate removable slides may be employed instead of a single slide having slots of different sizes and shapes.

For preventing water of condensation that may accumulate on the upper front portion of the housing from being blown through the slot a flange 87 extending inward along the upper edge of the slot is provided. Water that may gather in the chamber 80 is returned to the tank through pipes 88.

The nozzle or nozzles 65 blowing the spray through the opening 81 formed in the front of housing 79 constitutes means for directing the spray to the gummed portions of the flaps, while said housing in combination with flange 87 and pipes 88, with its especial function of receiving and carrying off all spray and moisture that might otherwise spread to other parts of the envelop, comprises means for preventing the moistening of other portions of the envelops. It is to be noted, however, that the real directing means is the nozzles 65, the function of housing 79 and related parts being solely to protect other parts of the envelop from the spray and limit its application to the gummed flap.

In operation, starting with the operative parts of the machine in the positions shown in Figs. 1 and 2, the initial operation of the driving-shaft will start the carrier 37 downward on its vertical guides 33, causing the lower edge of the engaged envelop to bend the points of the supporting fingers 48 to allow the envelop to pass; a slight further movement will bring the envelop to contact with the resistance springs 49, which serve to hold the envelop against the face of the descending carrier, (see Fig. 3); and as the lower edge of the carrier nears the stack of envelops on the lower rack the pressure-springs 50 will engage them and press them back from the stops 12 to make room for the descending envelops. These operations are effected by about a third of a turn of the shaft 25 which serves to swing the cranks 27 from the position shown in Figs. 1 and 2 to that shown in Fig. 3; and a short further rotation will serve to seat the envelop in the lower rack, as shown in Fig. 4. When the envelop has thus been delivered, further rotation of the driving shaft to initial position will serve to rotate the cam-wheel 61 and thereby operate the flap folder 51 to engage the flap and bend and seal it to the racked envelop, as shown in Figs. 5 and 6.

During approximately the latter half of the shaft rotation the cam-wheel 46 will serve to so actuate the radius bar 40 as to retract the carriage from the position shown in Fig. 4 and to move it to the successive positions shown in Figs. 5 and 6 and return it to the operative position shown in Figs. 1 and 2. And during the same portion of the operation the rotation of the cam-wheel 61 will actuate the pump-rod 77 to cause air to be compressed in the air-pump and discharged to operate the atomizers and spray the exposed envelop flap on the upper rack. Thus a single rotation of the driving-shaft serves to effect the complete cycle of operations described.

Having described my invention, what I claim and desire to secure by Letters Patent is—

1. In an envelop sealing machine, the combination with means for exposing the flaps of successive envelops at the same place, of a spraying device, means for directing the spray to the gummed portions of the flaps, and means for preventing the moistening of other portions of the envelops.

2. In an envelop sealing machine, the combination with means for exposing the flaps of successive envelops at the same place, of a spraying device, means for directing the spray to the gummed portions of the flaps, and adjustable means for regulating the spread of the spray for envelops of different sizes.

3. In an envelop sealing machine, the combination with means for exposing the flaps of successive envelops at the same place, of a spraying device, means for directing the spray to the flaps, and means for controlling the spreading of the spray.

4. In an envelop sealing machine, the combination with means for exposing the flaps of successive envelops at the same place, of an intermittently operating spraying device, means for directing the spray to the flaps, and an intermittently operating carrier for removing the sprayed envelops in succession.

5. In an envelop sealing machine, the combination with means for exposing the flaps of successive envelops at the same place, of an intermittently operating spraying device, means for directing the spray to the flaps, a flap folder, a sealing device, and a traveling carrier for removing the sprayed envelops in succession and presenting them successively to the action of the flap folder and sealing device.

6. In an envelop-sealing machine, the combination with automatic means for successively exposing the gummed flaps of the envelops to be moistened, of a spraying device, means for operating the spraying device periodically to spray the exposed flaps, and means for regulating the spread of the spray, substantially as set forth.

7. In an envelop-sealing machine, the combination with means for successively exposing the gummed flaps of the envelops to be moistened, of an atomizer, a spray-deflector for directing the spray to the envelop flap, and means for operating the atomizer for spraying the flaps as they are successively exposed, substantially as set forth.

8. In an envelop-sealing machine, the combination with means for successively exposing the gummed flaps of the envelops to be moistened, of an atomizer, a spray-deflector for directing the spray to the envelop flap, means for varying the spread of the spray to conform it substantially to the gummed surface of the flap, and means for operating the atomizer for spraying the flaps as they are successively exposed, substantially as set forth.

9. In an envelop-sealing machine, the combination with means for successively exposing the gummed flaps of the envelops to be moistened, of an atomizer, a spray-deflector for directing the spray to the envelop flap, means for preventing water of condensation from being entrained by the spray, and means for operating the atomizer for spraying the flaps as they are successively exposed, substantially as set forth.

10. In an envelop-sealing machine, a spraying device including means for causing the spray to issue in a thin sheet, a feed device, means for supporting thereon a stack of envelops with their flaps extended, means for yieldingly pressing the stack toward and successively presenting the envelop flaps to the action of the sprayer, means for directing the spray to the gummed margins of the flaps, a flap-folder, a carrier for conducting the envelops in succession from the feed device to position to be operated upon by the folder, and means for producing timely operations of the spraying device, the carrier, and the flap-folder, substantially as set forth.

11. In an envelop-sealing machine, a spraying device, a feed device, means for supporting thereon a stack of envelops with their flaps extended, means for yieldingly pressing the stack toward and successively presenting the envelop flaps to the action of the sprayer, a carrier for removing the sprayed envelops in succession, a holder for receiving them from the carrier, and a folder for sealing the flap of the envelop after it is delivered to the holder, substantially as set forth.

12. In an envelop-sealing machine, a feed rack for holding a stack of envelops with their flaps extended, means for yieldingly pressing the stack toward the feeding point, a sprayer for moistening the flap of the exposed envelop, a storage rack, a carrier for transferring the sprayed envelop from the former to the latter rack, and means for sealing the successive envelops upon their delivery to the storage rack, substantially as set forth.

13. In an envelop-sealing machine, a feed rack for holding a stack of envelops with their flaps extended, means for yieldingly pressing the stack toward the feeding point, a sprayer for moistening the flap of the exposed envelop, a storage rack, means for yieldingly pressing the envelops stacked thereon, a carrier adapted to transfer the sprayed envelop from the feed rack to the storage rack and to compress the stack thereon to make room for the transferred envelop, substantially as set forth.

14. In an envelop-sealing machine, a feed rack for holding a stack of envelops with their flaps extended, means for yieldingly pressing the stack toward the feeding point, a sprayer for moistening the flap of the exposed envelop, a storage rack, means for yieldingly pressing the envelops stacked thereon, a carrier adapted to transfer the sprayed envelop from the feed rack to the storage rack and to compress the stack thereon to make room for the transferred envelop, and means for sealing the envelop so delivered by the carrier, substantially as set forth.

15. In an envelop-sealing machine, a feed rack for holding a stack of envelops with their flaps extended, means for yieldingly pressing the stack toward the feeding point, a sprayer for moistening the flap of the exposed envelop, a storage rack, a carrier for transferring the sprayed envelop from the former to the latter rack, guiding devices intermediate the racks for holding the envelop to contact with its carrier, and means for sealing the successive envelops when delivered to the storage rack, substantially as set forth.

16. In an envelop-sealing machine, a feed rack for holding a stack of envelops with their flaps extended, means for yieldingly pressing the stack toward the feeding point, a sprayer for moistening the flap of the exposed envelop, a storage rack, a carrier for transferring the sprayed envelop from the former to the latter rack, means for sealing the successive envelops when delivered to the storage rack, and means for adjusting the feed rack relative to the sprayer and the storage rack relative to the sealing device for envelops of different widths, substantially as set forth.

17. In an envelop-sealing machine, the combination with a spraying device and means for actuating it to throw a spray periodically, of an automatic feed device for holding envelops with their flaps extended substantially on the planes of the envelops, and a carrier for removing the envelops successively after their flaps have been sprayed, substantially as set forth.

18. In an envelop-sealing machine, the combination with an automatic feed-device for holding envelops with their flaps extended, a periodically operating spraying device for spraying the flap of the first envelop, a carrier for removing the sprayed envelop, a holder for receiving it from the carrier, and a folder for sealing the flap when the envelop is delivered to the holder, substantially as set forth.

19. In an envelop-sealing machine, the combination with means for exposing the flaps of successive envelops at the same place, of a spraying device, a housing for preventing the diffusion of the spray, and means for directing it to the gummed portions only of the flaps.

In testimony whereof I have signed my name to this specification in the presence of two subscribing witnesses this 1st day of April, 1909.

GUIDO J. ALBRECHT.

Witnesses:
P. H. GUNCKEL,
H. A. BOWMAN.